J. C. PFEIL.
Draft Equalizer.

No. 108,179.

Patented Oct. 11, 1870.

Witnesses
Victoria M. Cole
Ruth K. Abbott

Inventor
John C. Pfeil
by Job Abbott

United States Patent Office.

JOHN CASPER PFEIL, OF ARENZVILLE, ILLINOIS.

Letters Patent No. 108,179, dated October 11, 1870.

IMPROVEMENT IN THREE-HORSE EQUALIZERS.

The Schedule referred to in these Letters Patent and making part of the same.

*To all whom it may concern:*

Be it known that I, JOHN CASPER PFEIL, of Arenzville, Cass county, Illinois, have invented certain Improvements in Three-Horse Draft-Equalizers; and that the following is a full, clear, and exact specification thereof.

Nature and Objects of Invention.

My invention relates to an improved construction of draft mechanism for three horses; and It consists—

First, in the use of a rock-shaft, having arms of unequal lengths arranged opposite to each other at its ends, which is arranged across the draft-tongue, and to the arms of which are attached a single horse and two horses respectively, whereby the draft of the single horse is made to balance that of the two horses, and the draft of the team is applied to the tongue at two points, one at each side of the tongue, for the purpose of overcoming side draft and vibration.

The second part of my invention consists in the combination of a stay-chain and pulley with the draft-tongue, rock-shaft, and long lever, by which the side draft, which would otherwise result from the draft of two horses at one side of the tongue against the draft of one horse at the other side, is made to counterbalance the leverage obtained by the horse on the long arm of the long lever over the horse on the short arm, thus equalizing the draft of the horses, and preventing any side draft.

Description of Accompanying Drawing.

General Description.

A is the draft-tongue, which is attached at the end T to the plow, wagon, reaper, or other implement or object to which the draft is to be applied.

The rock-shaft B is secured across the tongue in the box-pieces R S, and the long lever K is arranged in a slide, J, on the under side of the tongue.

The single-tree C is attached, by a link, U, to the long arm of the lever K, and the clasp M, provided with the pulley N, is secured to the short arm of said lever.

The stay-chain L is secured, by a staple, P, to the tongue A, and passes through the clamp M around the pulley N, and has the single-tree E attached to its end.

The long lever K is attached, by a link, H, to the arm G of the rock-shaft B, and the single-tree D is attached, by a link, V, to the arm F of said rock-shaft.

The arm F of the rock-shaft is made twice the length of the arm G, so that the horse at D has a lever-arm, F, two times as long as the lever-arm G, to which the draft of the horses at C and E is applied, (as the shaft B serves as the axis of a lever, of which the arms F and G are the arms,) thus equalizing the draft of the single horse at D, and of the two horses at C and E.

Figure 1:
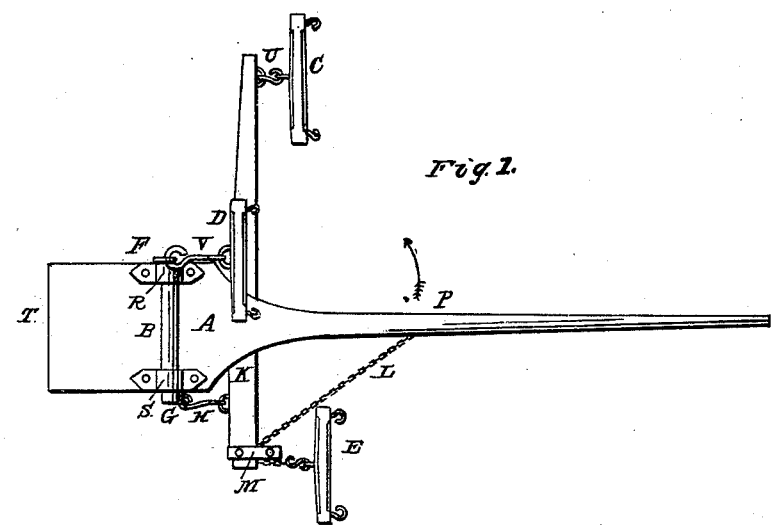
Figure 1 is a plan of a three-horse equalizer, embodying my invention.
Figure 2:
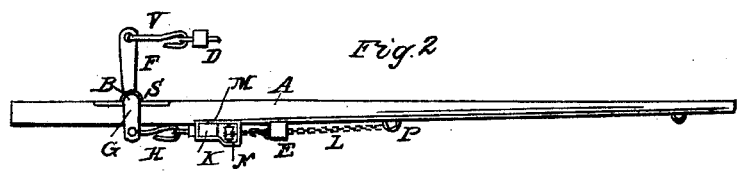
Figure 2 is a side view of the same.
Figure 3:
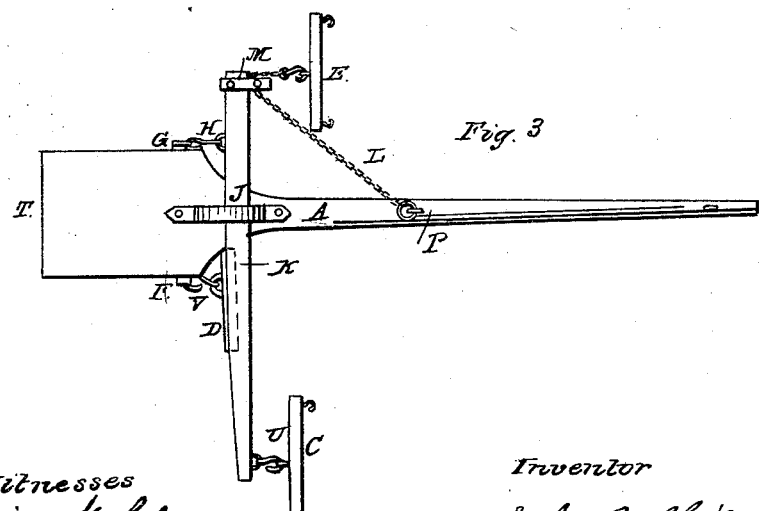
Figure 3 is a plan of the same as seen from below.

It is seen that the draft of the team is applied at the two ends of the shaft B, and that the draft of one horse is applied at R, and that of the two horses at S. Consequently, the draft on the rock-shaft B would tend to produce a movement of the tongue A around the point of application T, as indicated by arrow in fig. 1.

But this side thrust is taken up by the stay-chain L, and thus acts on said stay-chain in connection with the draft of the horse at the other end E of the stay-chain, by which the mechanical advantages obtained by the horse at C, on the long arm of the lever K, over the horse at M on the short arm of said lever, is sufficiently overcome to enable the horse at E to balance the draft of the horse at C.

The position of the staple P on the tongue A will vary, as the relative lengths of the arms of the long lever K, and the position of the point of application T, with respect to the rock-shaft B, and can be readily determined by any mechanic by an application of the ordinary mechanical rules relating to the lever.

It is seen that, in addition to the advantages of counteracting any side draft, and of holding the tongue under a lateral tension by which its side vibrations are checked, this construction allows of two horses being placed at one side of the tongue, and of the third horse being brought close up to the tongue on the other side, so that the horse at E can walk in the furrow in plowing, or can walk outside of the uncut grass or grain in mowing or reaping, and that in plowing it raises the point of draft of the center horse above the points of draft of the outside horses, thus allowing the furrow horse to walk in the furrow, the center horse to walk on the edge of the furrow, and the third horse to walk out on the land, without throwing the points of draft too high or too low to suit any of the horses.

It is also seen that the main line of draft is through the body of the tongue, so that there is no tendency on the part of the tongue to vibrate up and down at the front end.

Claim.

What I claim as my invention, and desire to secure by Letters Patent, is—

1. The rock-shaft F B G, when used in combination with the draft-tongue A, for the purpose of equalizing the draft of the center horse and outside horses, and obtaining two points of draft on the tongue, substantially as specified.

2. The combination of the rock-shaft F B G, draft-tongue A with slide-plate J thereon, long draft-lever K with pulley N thereon, and stay-chain L, the single-trees C D E being combined with said parts as shown, and the several parts being arranged as specified.

As evidence of the foregoing specification and claim, I have hereunto set my hand this 17th day of August, A. D. 1870.

JOHN CASPER PFEIL.

Witnesses:
J. L. CIRÉ,
ALBERT FELDNER.